Nov. 9, 1971   C. W. CLARK   3,618,258
SLOT CAR HAVING IMPROVED FRAME AND ELECTRICAL PICK-UP
Filed Jan. 15, 1970
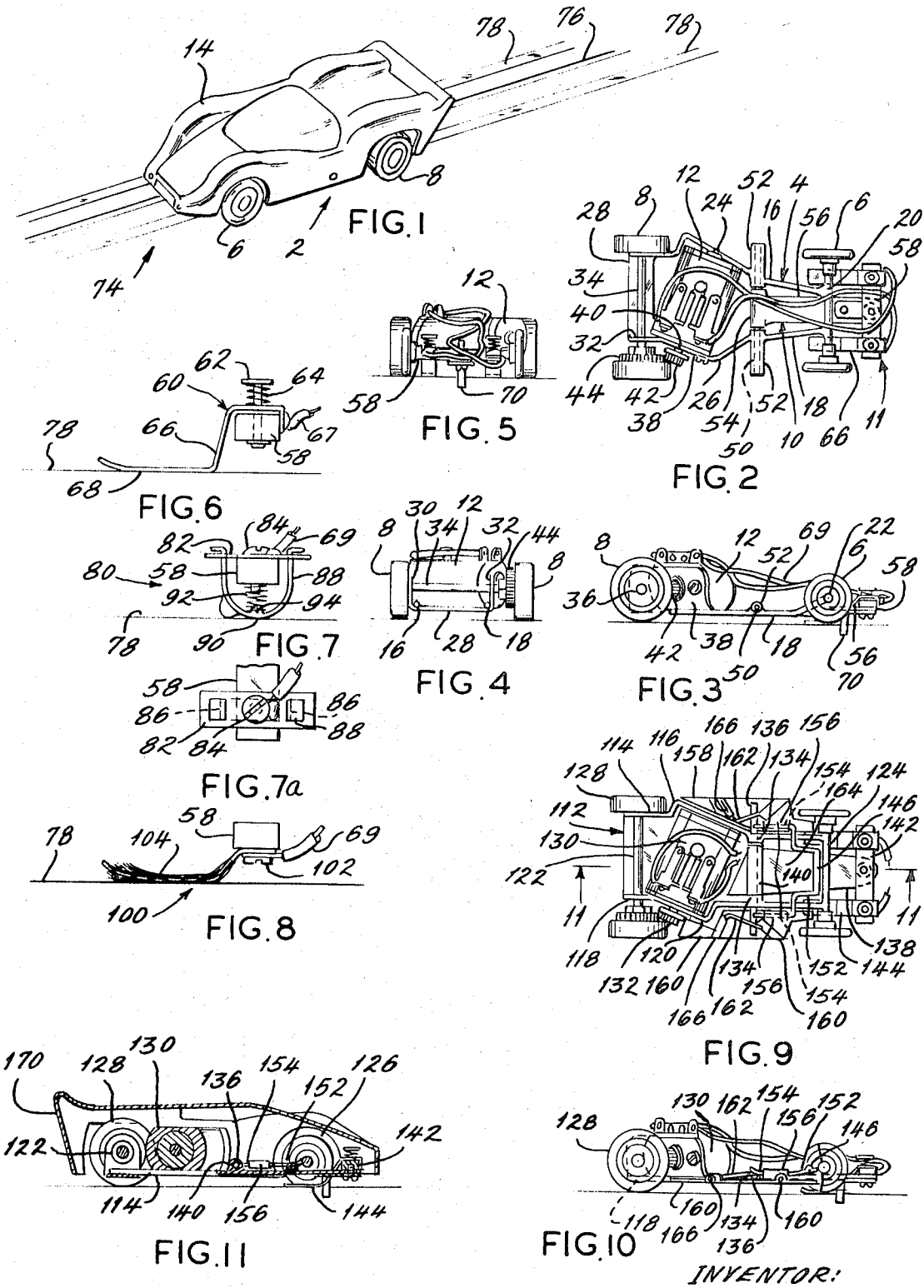
INVENTOR:
CHARLES W. CLARK
BY Gravely, Lieder & Woodruff
ATTORNEYS United States Patent Office 3,618,258
Patented Nov. 9, 1971

3,618,258
SLOT CAR HAVING IMPROVED FRAME AND
ELECTRICAL PICK-UP
Charles William Clark, 1238 Watts,
University City, Mo. 63130
Filed Jan. 15, 1970, Ser. No. 2,984
Int. Cl. A63h 33/26
U.S. Cl. 46—243
21 Claims

ABSTRACT OF THE DISCLOSURE

A slot car having a frame comprised of two side rails traversed at their ends by tubular journals which receive front and rear wheel axles. The rear axle carries a spur gear which meshes with a pinion gear or the drive shaft of a motor. The motor is nestled between the side rails such that its drive shaft is oblique to the rear axle. A guide arm hinges to the frame about a transverse hinge pin, and at its forward end is provided with a pin which engages the slot in the track on which the car runs. The guide arm further carries a dielectric cross bar at its forward end and the cross bar has a pair of contactors which engage electrified rails in the track. The contactors may be blades, U-shaped shoes, or metallic bristles. The body of the car is mounted to permit flexure of the frame.

BACKGROUND OF THE INVENTION

This invention relates in general to miniature automotive vehicles, and more particularly to slot cars.

The racing of miniature vehicles on slotted raceways provided with electrified rails, or slot car racing as it is more commonly known, has experienced widespread popularity in recent years. Slot cars of current manufacture possess various disadvantages which detract from their operating characteristics. For example, the electrical contactors on many current slot cars do not maintain continuous contact with the electrified rails as the car negotiates corners, and consequently full power is not available at such corners. This is particularly true of the smaller scale slot racers. Other cars of current manufacture have one or more idler gears in their gear trains between their motors and drive wheels and the power required to rotate the idler gears is considerable in some instances. Still other cars have rigid frames which do not flex as those cars negotiate turns, and as a result some of the drive and guide wheels leave the raceway. In this same vein, some cars have their motors mounted relatively high with respect to the raceway so that the high center of gravity resulting therefrom tends to roll the car over when curves are negotiated at high speeds.

SUMMARY OF THE INVENTION

One of the principal objects of the present invention is to provide a slot car capable of achieving extremely high speeds and having excellent handling characteristics. Another object is to provide a slot car with electrical contactors which maintain continuous contact with the electrified rails of the raceway. A further object is to provide a slot car having an extremely low center of gravity. An additional object is to provide a drive train for a slot car which is very efficient. Still another object is to provide means for mounting a body of a slot car such that the body does not rigidify and thereby detract from the flexibility of the frame. These and other objects and advantages will become apparent hereinafter.

The present invention is embodied in a slot car having a frame in which the motor is mounted such that its drive shaft is oblique to the rear axle so that the drive shaft and rear axle are connected to one another through only two gears. The invention also includes a guide arm hinged to a slot car frame about a transverse axis and having a cross member at its forward end for supporting contactors. This invention also consists in the parts and in the arrangements and combinations of parts hereinafter described and claimed.

DESCRIPTIONS OF THE DRAWINGS

In the accompanying drawings which form part of the specification and wherein like numerals and letters refer to like parts wherever they occur:

FIG. 1 is a perspective view of a slot car constructed in accordance with and embodying the present invention;

FIG. 2 is a plan view of the slot car without its body;

FIG. 3 is a side elevational view of the slot car without its body;

FIG. 4 is a rear elevational view of the slot car without its body;

FIG. 5 is a front elevational view of the slot car without its body;

FIG. 6 is an elevational view of an electrical contactor assembly forming part of the present invention;

FIG. 7 is a side elevational view of a modified electrical contactor assembly;

FIG. 7A is a fragmentary plan view of the contactor assembly shown in FIG. 7;

FIG. 8 is a side elevational view of still another electrical contactor assembly;

FIG. 9 is a plan view of a modified slot car without its body;

FIG. 10 is a side elevational view of the modified slot car shown in FIG. 9; and FIG. 11 is a sectional view taken along line 11—11 of FIG. 9 and further showing the body of the modified slot car.

DETAILED DESCRIPTION OF THE INVENTION

Referring now in detail to the drawings, 2 designates a slot car which broadly includes a frame 4, front and rear wheels 6 and 8, respectively, journaled on the frame 4, a guide assembly 10 hinged to the frame 4, an electrical pick-up assembly 11 on the guide arm 10, a motor 12 mounted on the frame 4, and a body 14 carried by the frame 4.

More specifically, the frame 4 includes a pair of side rails 16 and 18 which are preferably formed from wire, and in case HO or 1/87 scale cars 2, 1/32 inch diameter brass or steel wire has proved ideally suited for this purpose. At their forward ends the side rails 16 and 18 are connected by a tubular journal 20 through which a front axle 22 extends and the front wheels 6 are secured to the outer ends of the axle 22. Intermediate its ends, the left side rail 16 extends outwardly at an oblique angle to the longitudinal centerline of the frame and then turns back inwardly at approximately 90° to oblique portion, all in the formation of a right angle dog leg 24. The other side rail 18 also turns outwardly at about the same location and then turns to a longitudinal disposition which in turn merges into an inwardly turned segment, all in the formation of an outwardly bowed portion 26 on the rear end of the side rail 18. Beyond the dog leg 24 and the outwardly bowed portion 26 the side rails 16 and 18 project rearwardly and are traversed by a mounting bracket 28 having a base plate to which the rear ends of the rails 16 and 18 are soldered and a pair of upwardly turned ears 30 and 32 through which a tubular journal 34 extends. The journal 34, in turn, receives a rear axle 36, and connected securely to the ends of the axle 36 are the rear drive wheels 8. Beyond the journal 34 the ear 32 extends obliquely toward the outwardly bowed portion 26 of the side rail 18 in the provision of a mounting plate 38 which is soldered at its forward end to bowed portion 26. The mounting plate 38 is furthermore disposed parallel to the oblique segment of the dog leg 24 in the side rail 16 so that the two in effect form a cradle or recess in the frame 4 for accommodating the motor 12 in extremely close proximity to the surface on which the car 2 rides. In particular, the front end of the motor 12 is bolted to the mounting plate 38 with the drive shaft 40 of the motor 12 presented at approximately the same elevation as the rear axle 36 and disposed obliquely with respect thereto. One end of the drive shaft 40 projects through the mounting plate 38, beyond which it is fitted with a pinion gear 42, and the pinion gear 42 meshes with a larger spur gear 44 secured to the axle 36 intermediate the ear 32 and the rear wheel 8 disposed outwardly therefrom. Thus, the rear wheels 8 are powered by the motor 12 operating through a gear train consisting of only the two gears 42 and 44.

The guide assembly 10 is hingedly connected to the frame 4 by means of a hinge pin 50 having its ends secured in axially aligned sleeves 52 which are soldered to the side rails 16 and 18 immediately ahead of the oblique segments of the dog leg 24 and outwardly bowed portion 26, respectively. Journaled on the pin 50 intermediate the opposed ends of the sleeves 52 is a collar 54 to which a forwardly extending guide arm 56 is attached, and the arm 56 at its forward end carries the electrical pick-up assembly 11 which includes a dielectric cross bar 58 having a pair of contactors 60 (FIG. 6) at its ends. In particular, the bar 58 has a flat upper surface and the contactors 60 include headed studs 62 which project upwardly from the ends of that surface. The heads of the studs 62 retain compression springs 64 which encircle the shanks of those studs 62 and bear against the leading portions of contactor blades 66. The leading portions of the contactor blades 66 are flat so that when no other force is exerted on them they seat against the flat upper surface of the bar 58. At the front and rear edges of the flat upper surface the blades 66 turn abruptly downwardly in general conformance to the contour of the bar 58, and beyond the rear face of the bar 58 the blades 66 curve rearwardly and terminate trailing contactor surfaces 68 having a general horizontal disposition. The spring 64, by bearing against the leading portions of the blades 66, urges the trailing portions of the blades 66 downwardly. The downwardly turned portions of the blades 66 located adjacent to the front and rear surfaces of cross bar 58 prevent the blades 66 from rotating significantly with respect to the studs 62, or in other words, prevent the blades 66 from going askew on the ends of the bars 58. The spacing between trailing portions of each of the blades 66 equals the spacing between the two electrified rails on a conventional slot car raceway. Electrical lead wires 69 connect the leading portions of the contactor blades 66 with the motor 12.

To the rear of the cross bar 58 a guide pin 70 projects downwardly from the guide arm 56, and it is disposed centrally between the contactor surfaces 68 on the blades 66. The pin 70 is moreover rigid and sized to fit within the guide slot of a conventional slot car raceway.

The body 14 is attached to the side rails 16 and 18 of the frame 4 by means of screws which thread into the outwardly presented ends of the sleeevs 52. Thus, the body 14 is attached to the frame 4 at one location on each side thereof, and therefore does not impart any further rigidity to the frame 4.

The slot car 2 is operated on a conventional slot car track or raceway 74 (FIG. 1) having a centrally disposed guide slot 76 flanked by a pair of electrified rails 78. The spacing between the guide pin 70 and the contactor surfaces 68 on each side of it corresponds to the spacing between the slot 76 and electrified rails 78 so that when the pin 70 is inserted into the slot 76 with the car 2 generally aligned with it the contactor surfaces 68 of the blades 66 will bear against and establish electrical contact with the electrified rails 84. When the pin 70 is disposed within the slot 82, the weight of the forward end of the guide arm 10 causes that end to drop downwardly, which in turn tends to shift or rotate the contactor blades 66 about the forward edge of the cross bar 58. In so doing the leading portion of the blades 66 act against the bias of and compress the springs 64. By means of the foregoing construction, the contactor surfaces 68 on the blades 66 are always biased toward the electrified rails 78 and remain in contact with the rails 78 even when one side of the cars lifts away from the track 74 or when the rails 84 are slightly undulated.

Since the motor 12 drives the rear axle 36 and rear wheels 8 through a drive train consisting of only two gears, namely the pinion gear 42 and spur gear 44, maximum efficiency is achieved and the moment of inertia for the gear train is reduced to a minimum. Thus, no power is wasted in idler gears as is true of conventional racers having so-called sidewinder drives, that is drives in which the drive shaft of the motor extends transversely across the car, and similarly acceleration is improved since none of the torque generated by the motor is required for accelerating such idler gears.

Since the dog leg 24 in the side rail 16 and the outwardly bowed portion 26 in the side rail 18 creates a cradle or recess in the frame 4 which receives the motor 12, the motor 12 is nestled as low as possible within the frame 4. Consequently, the car 2 possesses an extremely low center of gravity, and this coupled with the flexibility of the frame 4, imparts excellent handling characteristics to the car 2.

Referring now to FIGS. 7 and 7A it is possible to replace the contactors 60 with modified contractors 80 which are also mounted on the ends of the dielectric cross bar 58. Each contactor 80 includes a mounting plate 82 which is fastened tightly against the flat upper surface of the bar 58 by a screw 84 threaded into the bar 58. The mounting plate 82 projects forwardly and rearwardly beyond the bar 58 and at its ends is provided with slots 86 (FIG. 7A) which receive the upper ends of a U-shaped contactor shoe 88. The downwardly presented surface on the bight portion of the shoe 88 forms a contactor surface 90 and the upper ends of the legs project through the slots 86 and are bent over toward the screw 84 to secure the shoe to the mounting plate 82. The contactor surface 90 on the shoe 88 is biased downwardly by a spring 92 (FIG. 7) which is interposed between the bar 58 and the bight portion of the shoe 88. The upper end of the spring 92 is retained in position by the lower end of the screw 84 which projects into it, while the lower end of the spring 92 is restrained by a boss 94 formed on the bight portion of the shoe 88. The shoes 88 are, of course, positioned on the cross bar 58 such that the spacing between their contactor surfaces 90 equals the spacing between the electrified rails 78. One of the lead wires 69 is connected to the plate 82 adjacent to the screw 84.

When the car 2 provided with modified contactors 80 is placed on the track 74, the weight of the arm 10 forces the contactor shoes 88 into engagement with the electrified rails 78 and will further compress the springs 92 so that the shoes 88 are in effect spring biased against the rails 78. Consequently, when the car 2 encounters a turn or a section of undulated rail 78 the contactor surfaces 90 of the shoes 88 will still maintain electrical contact with the rails 78.

As will be seen by reference to FIG. 8 it is also possible to replace the contactors 60 with still other modified contactors 100 which are likewise carried by the dielectric cross bar 58. Each contactor 100 includes a screw 102 which is threaded into the bar 58 from the underside thereof. The end of one of the motor leads 69 is captured between the head of the screw 102 and the underside of the bar 58 and so is the leading end of a contactor brush 104. The brush 104 is composed of a multiplicity of electrically conductive bristles, such as small copper wires, which project rearwardly and downwardly for engagement with one of the underlying electrified rails 78. A dielectric shield should be mounted on the guide arm 10 between the two brushes 104 to prevent contact between individual bristles thereof.

Turning now to FIGS. 9–11 it is possible to provide a modified slot car 110 which is very similar to the car 2 and includes a frame 112 having a side rail 114 provided with a dog leg 116 and another side rail 118 provided with an outwardly bowed portion 120 which is identical to the dog leg 116 but reversed in position. The rails 114 and 118 terminate at tubular journals 122 and 124 for providing a journal for front and rear wheels 126 and 128, respectively. The frame 112 further cradles a motor 130 between the dog leg 116 and the outwardly bowed portion 120, and the motor 130 drives the rear wheels 128 through a gear train 132 composed of only two gears.

Similarly, immediately ahead of the dog leg 116 and the outwardly bowed portion 120 the sleeves 134 are secured to the side rails 114 and 118, and extending through the sleeves 134 is a hinge pin 136. The hinge pin 136 carries a guide arm 138 including a collar 140 which is journaled on the pin 136 intermediate the sleeves 134. The guide arm 138 extends forwardly beneath the tubular journal 122, beyond which it is provided with a dielectric cross bar 142 having contactors 144 at its ends. The contactors 144 may be similar to the contactors 60, 80 or 100.

Adjacent to the tubular journal 122 the guide arm 138 is traversed by a sleeve 146 which positions and retains a body mount including a supporting wire 152 which extends through the sleeve 146 and is provided with a pair of dog legs on each side thereof. Beyond the dog legs, the wire 152 extends rearwardly in the provision of mounting spindles 154 which are spaced slightly outwardly from the side rails 114 and 118, and are normally disposed generally parallel thereto. The spindles 154 fit within and journal support collars 156 to which side plates 158 and 160 are soldered, and the side plates 158 and 160 are disposed generally horizontally in approximately the same plane defined by the side rails 114 and 118 and have their inner margins contoured to conform the contour of the side rails 114 and 118, respectively. Beyond the support collars 156 the rear end of the spindles 154 are turned upwardly at an oblique angle to the collars 156, and those ends project over the ends of the hinge pin 136 protruding beyond the sleeves 134 (FIGS. 9 and 10). Thus, the wire 152 and side plates 158 and 160 are precluded from swinging downwardly about the sleeve 146 on the guide arm 138. Similarly, the side plates 158 and 160 are prevented from swinging downwardly on the spindles 152 by means of short restraining wires 162 which are soldered to plates 158 and 160 and also project above the laterally protruding portions of the hinge pin 136. In this connection, it should be noted that the spacing between the rear ends of the mounting spindles 154 and the forward ends of restraining wires 162 on one hand and the upper surfaces of the side plates 158 and 160 on the other is greater than the diameter of the hinge pin 136 to afford the plates 158 and 160 a limited amount of movement. To prevent unrestrained movement of the side plates 158 and 160 between the foregoing limits, a thin spring wire 164 (FIG. 9) is soldered to the upper surface of the guide arm 138 under tension and the ends of this wire 164 bear against the collars 156 and frictionally restrain rotation of them on the spindles 164.

Soldered to the upper surface of the plates 158 and 160 are sockets 166 (FIGS. 9 and 10) into which pins are forced, and the pins pass through the side walls of a car body 170 for securing the body 170 to the side plates 158 and 160.

Due to the limited movement of the side plates 158 and 160 afforded by the previously described construction of the body mount 150, the frame 112 is free to flex relative to the body 170, and consequently the body 170 has little if any rigidifying effect on the frame 112. Therefore, the frame 112 flexes easily as the car negotiates corners, enabling the wheels 126 and 128 to remain in contact with the track 74. Accordingly, the corners may be negotiated at extremely high speeds.

This invention is intended to cover all changes and modifications of the example of the invention herein chosen for purposes of the disclosure which do not constitute departures from the spirit and scope of the invention.

What is claimed is:

1. A slot car for use on a track having a slot and electrified rails; said slot car comprising a flexible frame having a pair of wire-like side rails which bulge outwardly away from each other near the rear of the frame to form a motor recess, and cross members forming rigid connections between the side rails at the front and rear ends of the frame, a rear axle journaled in the frame at the rear end thereof, rear wheels attached securely to the rear axle, a spur gear mounted rigidly and concentric with respect to the rear axle, a motor set into the motor recess and secured to the frame, the motor having a drive shaft rotatable about an axis presented obliquely to the rear axle, a pinion gear on the drive shaft and meshing directly with the spur gear so that the drive train between the motor and rear wheels possesses only two gears, front wheels mounted on the frame adjacent to the front end thereof, guide means carried by the frame for engaging the slot in the track, electrical contactor means carried by the frame for engaging the electrified rails when the guide means engages the slot, the contactor means being electrically connected to the motor.

2. A slot car according to claim 1 wherein the cross member at the rear end of the frame comprises a mounting bracket through which the rear axle extends; wherein the bracket projects forwardly from the rear axle along one of the side rails in the provision of a mounting plate; and wherein the motor is secured to the mounting plate.

3. A slot car according to claim 2 wherein the mounting plate is presented generally vertically and extends along the end of the motor at which the pinion gear is located.

4. A slot car according to claim 3 wherein the cross member at the rear end of the frame further comprises a tubular journal through which the rear axle extends; wherein the mounting bracket includes at least two upwardly turned ears through which the rear tubular journal extends; and wherein the mounting plate projects forwardly from one of those ears.

5. A slot car according to claim 4 wherein the body is connected to the frame only at the side rails and only at a single location along each side rail.

6. A slot car according to claim 1 wherein the cross member at the rear end of the frame comprises a tube through which the rear axle extends; and wherein the cross member at the front end of the frame includes a tube through which a front axle extends, the front wheels being attached to the ends of the front axles.

7. A slot car according to claim 6 wherein the guide means comprises an arm hingedly connected to the side rails ahead of the outwardly bulged sections thereof and extending forwardly beyond the front tubular journal, and a pin rigidly connected to the arm and projecting downwardly therefrom for engagement with the slot in the track.

8. A slot car according to claim 7 wherein the guide arm is connected with the frame by hinge means comprising axially aligned sleeves secured to the frame rails ahead of the outwardly bulged sections thereof and extending transversely with respect thereto, a collar on the rear end of the guide arm and interposed coaxially between the inwardly presented ends of the sleeves, and a hinge pin extending through the sleeves and the collar.

9. A slot car according to claim 8 wherein the contactor means comprises a dielectric cross bar at the forward end of the guide arm and a contactor element on each end of the cross bar for engaging the electrified rails.

10. A slot car according to claim 8 and further characterized by a body covering the frame and motor, the body being connected to the frame only at the axially aligned sleeves of the hinge means so that the body does not significantly restrict flexure of the frame.

11. A slot car according to claim 1 and further characterized by a body covering the frame and motor, the body being connected to the frame only at the side rails and only at a single location along each side rail so that the body does not significantly restrict flexure of the frame.

12. A slot car for use on a track having a centrally disposed slot flanged by electrified rails; said slot car comprising a frame, front and rear wheels journaled on the frame, a motor carried by the frame and connected to at least one of the wheels for driving the same, a guide arm pivotally connected to the frame for swinging movement about an axis transverse to the frame, a guide element carried by the arm for engagement with the slot, a cross bar attached to the guide arm and extending transversely of the frame, the cross bar at its ends being provided with mounting means, U-shaped contactor shoes having side legs extending through the mounting means and being shiftable relative to the mounting means, the contactor shoes being spaced apart such that they align with and engage the electrified rails when the guide element is in the slot of the track, springs bearing against the bight portions of the U-shaped shoes for urging them downwardly, and stops on the legs of the shoes for engaging the mounting means to retain the shoes on the mounting means when the slot car is removed from the track.

13. A slot car for use on a track having a slot flanked by a pair of electrified rails; said slot car comprising a frame, front and rear wheels journaled on the frame, a motor carried by the frame and connected to at least one of the wheels for driving the same, a guide arm pivotally connected to the frame for limited swinging movement about an axis extending transversely of the frame, a guide pin attached rigidly to the guide arm and projecting downwardly therefrom ahead of the transverse axis about which the guide arm pivots, the guide pin being generally circular in cross section and projecting below the wheels for engagement with the slot whereby the car is guided along the track, and contactors carried by the guide arm for engaging the electrified rails when the guide pin is in the slot, the contactors being electrically connected to the motor.

14. A slot car according to claim 13 wherein at least one of the side rails is contoured to conform to the end of the motor positioned adjacent to it.

15. A slot car for use on a track having a slot flanked by a pair of electrified rails; said slot car comprising a frame having a pair of wire-like side rails and cross members forming rigid connections between the side rails at the front and rear ends of the frame, the side rails being easily flexible so that the entire frame flexes as the slot car negotiates the track, front and rear wheels mounted on the frame and journaled for rotation relative to the frame, a motor mounted on the frame and connected to one of the wheels for driving the same, guide means carried by the frame for engaging the slot in the track whereby the slot car is guided along the track, electrical contactors carried by the frame and positioned for engagement with the electrified rails when the guide means engages the slot, and a body covering the frame and motor and connected to the frame such that it does not significantly restrict the flexing of the frame.

16. A slot car according to claim 15 wherein the guide means comprises an arm pivotally connected to the frame for movement about an axis extending transversely of the frame, and means on the arm for engaging the slot; wherein body mounting means are provided which comprise side elements pivotally carried by the guide arm for movement about axes extending generally longitudinally with respect to the frame so that the side elements are pivoted longitudinally as well as transversely with respect to the guide arm, the elements being located outwardly from the side rails; and wherein a car body is secured to the side elements.

17. A slot car according to claim 16 wherein the body mounting means further comprises a supporting wire hingedly connected to the guide arm for swinging movement about a transverse axes located forwardly from the transverse axes at which the guide arm is connected to the frame, the supporting wire extending rearwardly adjacent to the side rails of the frame in the provision of spindles; and wherein the side elements are journaled on the spindles.

18. A slot car according to claim 17 wherein a hinge pin extends transversely across the frame and hingedly connects the guide arm with the frame, the hinge pin protruding beyond the side rails; and wherein the ends of the spindles extend over the protruding ends of the hinge pin and prevent the mounting elements from swinging downwardly about the transverse axis at the forward end of the arm.

19. A slot car according to claim 18 wherein the side elements are side plates located to the sides of the side rails and having their inner margins contoured to conform to the contour of the side rails; and wherein restraining members are secured to the plates and project above the protruding ends of the hinge pin to prevent the plates from swinging downwardly about the spindles.

20. A slot car for use on a track having a slot flanked by a pair of electrified rails, said slot car comprising a frame, front and rear wheels journaled on the frame, a motor carried by the frame and connected to at least one of the wheels for driving the same, a guide arm pivotally connected to the frame for swinging movement about an axis transverse to the frame, a guide element carried by the arm for engagement with the slot, a cross bar of polygonal cross section on the arm and extending transversely with respect to the frame, and contactors on the ends of the cross bar and positioned to engage the electrified rails when the guide element is in the slot, the contactors being electrically isolated from each other, each contactor comprising a contactor blade extending along at least two sides of the cross bar and contoured to generally conform to and seat against those portions of the bar along which it extends, the contactor blade further extending rearwardly from the contoured portions thereof at the bar and being provided with a contactor surface which engages the electrified rail on the track, connecting means for attaching the contactor blade to the bar, and a spring for biasing the contactor blade toward a position in which the contoured portions thereof are disposed against the two sides of the bar to which they conform in contour, whereby the blade is prevented from turning askew on the cross bar but can yield relative to the cross bar to follow contours in the electrified rail.

21. A slot car according to claim 20 wherein the connecting means comprises a pin projecting upwardly from the cross bar and extending loosely through the contoured portion of the blade; and wherein the spring is a coiled compression spring encircling the pin and compressed against the contoured portion of the blade so that the contoured portion of the blade is biased toward one side of the cross bar.

References Cited

UNITED STATES PATENTS

| 3,195,472 | 7/1965 | Rannalli | 46—243 R |
| 3,486,271 | 12/1969 | Feikema | 46—243 R |

OTHER REFERENCES

Model Science publication, vol. 6, No. 7, p. 67, July 1968.

LOUIS G. MANCENE, Primary Examiner

R. F. CUTTING, Assistant Examiner